United States Patent [19]

Dumestre, III

[11] Patent Number: 5,175,708
[45] Date of Patent: Dec. 29, 1992

[54] BATTERY POWDERED ACOUSTIC TRANSPONDER FOR USE IN UNDERWATER ENVIRONMENT

[75] Inventor: Alex Dumestre, III, Covington, La.

[73] Assignee: Navigation Technology Corporation, Covington, La.

[21] Appl. No.: 846,535

[22] Filed: Mar. 4, 1992

[51] Int. Cl.$^5$ .............................................. H04B 1/59
[52] U.S. Cl. ...................................................... 367/3
[58] Field of Search ........................................ 367/2-6; 441/11, 33

[56] References Cited

U.S. PATENT DOCUMENTS

| | | |
|---|---|---|
| 2,594,702 | 4/1952 | Woodard . |
| 2,739,296 | 3/1956 | Woodard . |
| 3,066,325 | 12/1962 | Hayes . |
| 3,125,975 | 3/1964 | Alsager et al. . |
| 3,130,703 | 4/1964 | Thompson . |
| 3,199,070 | 8/1965 | Baier, Jr. . |
| 3,230,500 | 1/1966 | Dunn . |
| 3,287,753 | 11/1966 | Race . |
| 3,293,676 | 12/1966 | Link . |
| 3,382,514 | 5/1968 | Boscov . |
| 3,402,687 | 9/1968 | Tsuji . |
| 3,415,317 | 12/1968 | Drivet . |
| 3,487,486 | 1/1970 | Leonard et al. . |
| 3,553,795 | 1/1971 | McDougal . |
| 3,638,722 | 2/1972 | Talley, Jr. . |
| 3,722,014 | 3/1973 | Hill et al. . |
| 3,742,440 | 6/1973 | Ehrlich et al. . |
| 3,775,736 | 11/1973 | Koomey . |
| 3,793,685 | 2/1974 | Knecht . |
| 3,889,307 | 6/1975 | Houot . |
| 4,024,491 | 5/1977 | Pellerin et al. . |
| 4,097,837 | 6/1978 | Cyr . |
| 4,110,726 | 8/1978 | Dorrance et al. . |
| 4,357,688 | 11/1982 | Dale et al. ............................ 367/4 |

Primary Examiner—Daniel T. Pihulic
Attorney, Agent, or Firm—Pravel, Gambrell, Hewitt, Kimball & Krieger

[57] ABSTRACT

An acoustic transponder device includes waterproof housing that accepts a battery pack with a water displacing connection placing the housing and battery pack in communication. The housing carries an electronics package. Both the housing and battery pack can be disposable components, and can be sealed upon manufacture to prevent water ingress.

20 Claims, 2 Drawing Sheets

BATTERY POWDERED ACOUSTIC TRANSPONDER FOR USE IN UNDERWATER ENVIRONMENT

BACKGROUND OF THE INVENTION

1. Field Of The Invention

The present invention relates to an underwater sonar tracking system and more particularly relates to an acoustic transponder that can be deployed in multiple positions for example along an underwater cable as used in seismic work. Even more particularly, the present invention relates to an underwater transponder that can be installed in an underwater array wherein an improved battery powered transponder uses a removable battery pack that plugs into an electronics module with a water displacing connection, both the battery pack and electronics package being disposable, self-contained and connectable structures that can be changed in a wet environment.

2. General Background

In seismic exploration, there is often employed an underwater array of acoustic transponders or slave transponders. A master transceiver unit is located on a survey vessel. Because of range limitations, it is often necessary to employ a very large quantity of cable transponders. Sometimes in very shallow water operation or in the use of "bay cables" and in R. F. telemetry buoy systems, acoustic ranges can be very short.

Slave transponders and the master transceiver unit often have to operate in high reverberation environments. If the survey prospect is located in a water depth of between two to twenty (2-20) meters for example, the maximum ranges could vary between fifty to three hundred (50-300) meters for example. In a worse case, transponders would have to be mounted at fifty to one hundred (50-100) meter intervals for example along the cable. A best case might be for example two hundred to three hundred (200-300) meter intervals along the cable.

Large gradients in the speed and sound velocity profile, caused by surface temperature and salinity, will tend to drastically limit the acoustic range. Shadow zones will be caused as the rays are bent downward to the bottom and then reflect upward toward the surface. This bending and reflection will cause many dead or shadow acoustic zones to be present. Acceptable bay cable positioning can be achieved in this environment, even if range data is presently fifty to sixty percent of the time. For this reason, it is extremely advantageous to be able to receive ranges from multiple transponder locations as the source vessel travels its seismic line. Thus, there is a need for a low cost, preferably disposable transponder construction for solving the above-discussed problem.

The following patents are known to Applicant, all of which relating to underwater acoustic devices and/or underwater marker devices.

| PATENT NO. | TITLE | ISSUE DATE |
|---|---|---|
| 2,594,702 | RETRIEVABLE MARINE MARKER | 04/29/52 |
| 2,739,296 | MARINE MARKER | 03/20/56 |
| 3,066,325 | REPLACEABLE MARINE MARKER | 12/04/62 |
| 3,125,975 | SUBMERGIBLE HULL PROPULSION AND CONTROL SYSTEMS | 03/24/64 |
| 3,130,703 | PERCUSSION RELEASE HOOK | 04/28/64 |
| 3,199,070 | SONIC CONTROL CIRCUITRY | 08/03/65 |

-continued

| PATENT NO. | TITLE | ISSUE DATE |
|---|---|---|
| 3,230,500 | TRANSMISSION OF TELEPHONY SPECTRUM OVER VLF CHANNELS | 01/18/66 |
| 3,287,753 | OCEANOGRAPHIC APPARATUS | 11/29/66 |
| 3,293,676 | INSTRUMENT CAPSULE | 12/27/66 |
| 3,382,514 | POSITIVE SCUTTLING BUOY | 05/14/68 |
| 3,402,687 | DEPTH-POSITIONING APPARATUS FOR UNDERWATER RESEARCH VEHICLES | 09/24/68 |
| 3,415,317 | EQUIPMENT FOR WIRE-LINING OPERATIONS IN SUBMARINE WELL DRILLINGS | 12/10/68 |
| 3,487,486 | REMOTELY CONTROLLED UNDERWATER BUOY | 01/06/70 |
| 3,553,795 | HYDRAULIC LATCH | 01/12/71 |
| 3,638,722 | METHOD AND APPARATUS FOR REENTRY OF SUBSEA WELLHEADS | 02/01/72 |
| 3,722,014 | RETRIEVABLE BUOY | 03/27/73 |
| 3,742,440 | SYSTEM FOR ACTIVATING A REMOTE UNDERWATER DEVICE | 06/26/73 |
| 3,775,736 | ACOUSTICAL UNDERWATER CONTROL APPARATUS | 11/27/73 |
| 3,793,685 | COUPLING APPARATUS FOR THE MOORING OF BOATS OR THE LIKE | 02/26/74 |
| 3,889,307 | REMOTE-CONTROLLED UNDERWATER BUOY | 06/17/75 |
| 4,024,491 | WIRELESS MARINE NAVIGATIONAL AID SYSTEM | 05/17/77 |
| 4,097,837 | UNDERWATER TRANSPONDER CALIBRATION ARRANGEMENT | 06/27/78 |
| 4,110,726 | NAVIGATION SYSTEM AND METHOD FOR DETERMINING THE POSITION OF AN OCEAN MINING SHIP | 08/29/78 |

SUMMARY OF THE PRESENT INVENTION

The present invention provides an improved transponder housing apparatus. The apparatus features a first watertight housing having a hollow interior with a first closed end portion and a second end portion defining a socket. A second watertight housing carries a battery pack that is correspondingly shaped to fit into the socket end portion of the housing. Upon placement of the battery pack into the socket, a water displacing electrical connection can be formed between the battery pack and the housing. An electronics package is contained within the housing interior.

The socket communicates with an electronics end cap defining an attachment for forming an electrical connection between the battery pack and the electronics package at the end cap A pair of battery terminals extend from the end cap into the socket. A pair of connectors on the battery pack are provided that can register with and connect to the battery terminals of the end cap. The electronics package includes an acoustic element for transponding/responding in an underwater environment.

In the preferred embodiment, the housing forms a continuous outer water which is in the form of a watertight shell.

In the preferred embodiment, the housing and the battery pack are each cylindrically shaped.

In the preferred embodiment, the housing has a closed end portion and an open socket end portion that receives the batter pack, and wherein the battery pack is shaped to fit the socket upon assembly so that water is displaced from the socket upon assembly.

In the preferred embodiment, the housing socket end portion communicates with a transverse plate that defines the end plate.

In the preferred embodiment, the transverse plate has two plate openings, each with a battery terminal pin.

In the preferred embodiment, the battery pack has a pair of battery terminal plug portions that register upon assembly into the pair of plate openings.

In the preferred embodiment, each plate opening and its corresponding plug are cylindrically shaped.

In the preferred embodiment, the battery pack has a cylindrical portion that fits into the socket.

In the preferred embodiment, the battery terminals are of differing diameters.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figures 1, 2:
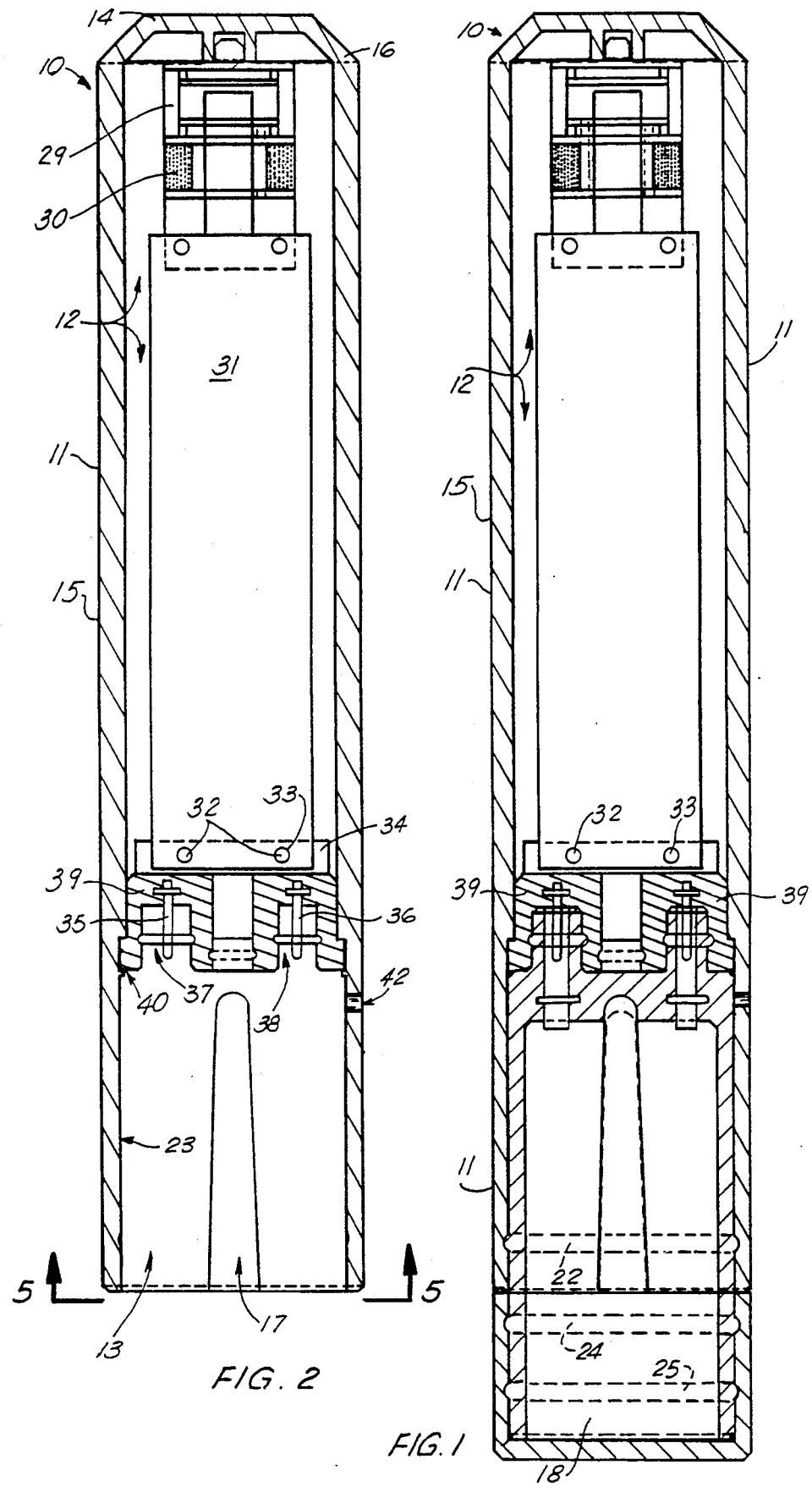
FIG. 1 is a sectional view of the preferred embodiment of the apparatus of the present invention.
FIG. 2 is a partial sectional view of the preferred embodiment of the apparatus of the present invention illustrating the electronics module.
Figure 4:
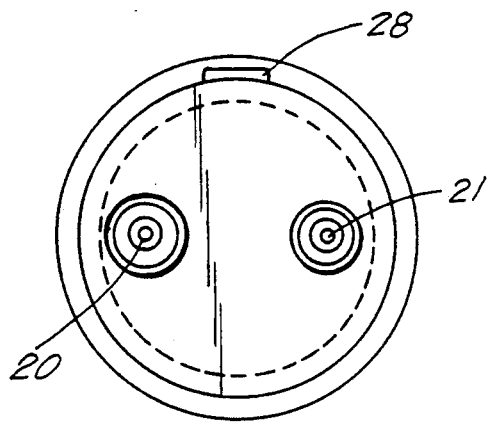
FIG. 4 is sectional view taken along line 4-4 of FIG. 3.
Figure 5:
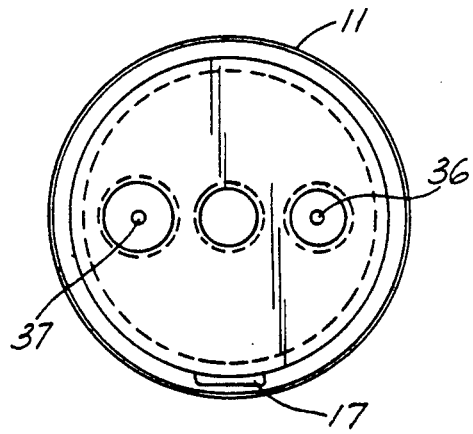
FIG. 5 is a sectional view taken along lines 5-5 of FIG. 2.
Figure 3:
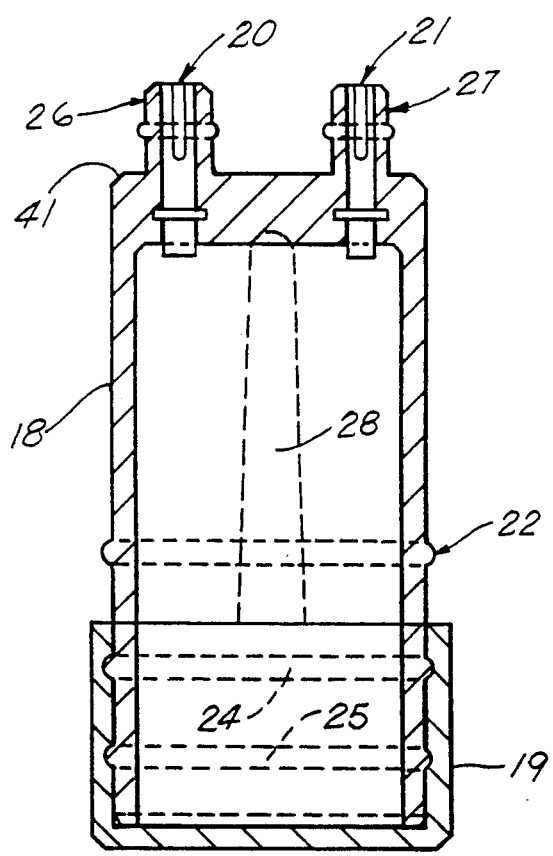
FIG. 3 is a sectional fragmentary view illustrating the preferred embodiment of the apparatus of the present invention showing the battery module.

FIGS. 1-5 illustrate the preferred embodiment of the apparatus of the present invention designated generally by the numeral 10. Transponder 10 provides a housing 11 having an interior 12. The housing 11 has open end 13 and closed end 14. The housing 11 provides cylindrical side wall 15 and at its end portion provides beveled annular surface 16. An alignment groove 17 is provided for aligning battery pack 18. Upon assembly of the battery pack 18 into the open end 13 of housing 11, end cap 19 covers the battery pack 18 opposite connector pin openings 20-21. An annular rib 22 forms a seal between battery pack 18 and housing 11 as do the pair of annular ribs 24, 25 with end cap 19. Housing 11 provides annular inner wall 23 at open end 13.

Each pin 20, 21 provides a cylindrical outer wall 26, 27 respectively. Alignment rib 28 of battery pack 18 registers with alignment groove 17 upon assembly.

An acoustic element 29 is contained within the housing 11, with a coil 30, and electronics package 31. A pair of connectors 32, 33 communicate with platform 34. Battery terminal pins 35, 36 are provided which connect with the pin openings 20, 21 of the battery pack. Sockets 37, 38 are defined adjacent the battery terminals 35, 36.

The electronics end cap 39 forms a seal, for preventing water from entering the interior of housing 11. Vent hole 42 through housing 11 wall 13 allows water to escape the open end 13 via openings 42 upon assembly of battery pack 18 into the open end 13 of housing 11. Annular shoulder 40 of housing 11 and annular shoulder 41 of battery pack 18 communicate upon assembly.

The following part list, labeled as Table 1 includes the part numbers as used on the drawings and in this written description together with the description of the part numbers are used herein.

TABLE 1

PARTS LIST

| PART NO | PART DESCRIPTION |
| --- | --- |
| 10 | Transponder Casing |
| 11 | housing |
| 12 | interior |
| 13 | open end |
| 14 | closed end |
| 15 | cylindrical side wall |
| 16 | beveled annular surface |
| 17 | alignment groove |
| 18 | battery pack |
| 19 | end cap |
| 20 | connector pin |
| 21 | connector pin |
| 22 | annular rib |
| 23 | annular wall |
| 24 | annular rib |
| 25 | annular rib |
| 26 | cylindrical wall of pin |
| 27 | cylindrical wall of pin |
| 28 | alignment rib |
| 29 | acoustic element |
| 30 | coil |
| 31 | electronics package |
| 32 | connector |
| 33 | connector |
| 34 | platform |
| 35 | battery terminal pin |
| 36 | battery terminal pin |
| 37 | socket |
| 38 | socket |
| 39 | electronics end cap |
| 40 | annular shoulder housing |
| 41 | annular shoulder |
| 42 | vent hole |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A transponder housing apparatus comprising:
   (a) a housing having a hollow interior with a first closed end and a second open end;
   (b) a battery pack that is correspondingly shaped to fit into the open end of the housing, forming a watertight seal therewith;
   (c) an electronics package housed within the housing interior;
   (d) an electronics end cap defining an attachment for forming an electrical connection between the battery pack and the electronics package;
   (e) a pair of battery terminals on the end cap;
   (f) a pair of connector pins on the battery that can register and connect to the battery terminals; and
   (g) the electronics package including an acoustic element for transponding or responding in an underwater environment.

2. The apparatus of claim 1 wherein the housing has an outer wall forming an outer watertight shell.

3. The apparatus of claim 1 wherein the housing is cylindrically shaped.

4. The apparatus of claim 3 wherein the housing has a closed end portion and an open socket end portion that receives the battery pack.

5. The apparatus of claim 4 wherein the housing socket end portion communicates with a transverse plate that defines the end plate.

6. The apparatus of claim 5 wherein the transverse plate has two plate openings each with a battery terminal pin.

7. The apparatus of claim 6 wherein the battery pack has a pair of battery terminal plug portions that register upon assembly into the pair of plate openings.

8. The apparatus of claim 7 wherein each plate opening and its corresponding plug are cylindrically shaped.

9. The apparatus of claim 1 wherein the battery pack has a cylindrical portion that fits into the socket.

10. The apparatus of claim 9 wherein the housing has a covering outer wall of a polymeric material.

11. A transponder housing apparatus comprising:
  (a) a watertight housing having a hollow interior with a first closed end and a second end defining a socket;
  (b) a watertight battery pack that is correspondingly shaped to fit into the socket end of the housing;
  (c) means for forming a water displacing connection between the battery pack and the housing;
  (d) an electronics package housed within the housing interior;
  (e) the socket communicating with an electronics end cap defining an attachment for forming an electrical connection between the battery pack and the electronics package;
  (f) a pair of battery terminals extending from the end cap into the socket;
  (g) a pair of connectors on the battery that can register with and connect to the battery terminals of the end cap; and
  (h) the electronics package including an acoustic element for transponding/responding in an underwater environment.

12. The apparatus of claim 11 wherein the housing has an outer wall forming an outer watertight shell.

13. The apparatus of claim 11 wherein the housing is cylindrically shaped.

14. The apparatus of claim 13 wherein the housing has a closed end portion and an open socket end portion that receives the battery pack, and wherein the battery pack is shaped to fit the socket upon assembly so that water is displaced from the socket.

15. The apparatus of claim 14 wherein the housing socket end portion communicates with a transverse plate that defines the end plate.

16. The apparatus of claim 15 wherein the transverse plate has two plate openings each with a battery terminal pin.

17. The apparatus of claim 16 wherein the battery pack has a pair of battery terminal plug portions that register upon assembly into the pair of plate openings.

18. The apparatus of claim 17 wherein each plate opening and its corresponding plug are cylindrically shaped.

19. The apparatus of claim 11 wherein the battery pack has a cylindrical portion that fits into the socket.

20. The apparatus of claim 19 wherein the housing has a covering outer wall of a polymeric material.

* * * * *